Dec. 22, 1970      C. K. RICE      3,549,424

METHOD FOR PRODUCING FILAMENTARY BORON

Filed Feb. 24, 1967      2 Sheets-Sheet 1

INVENTOR
CHARLES RICE
BY Richard N. James
ATTORNEY

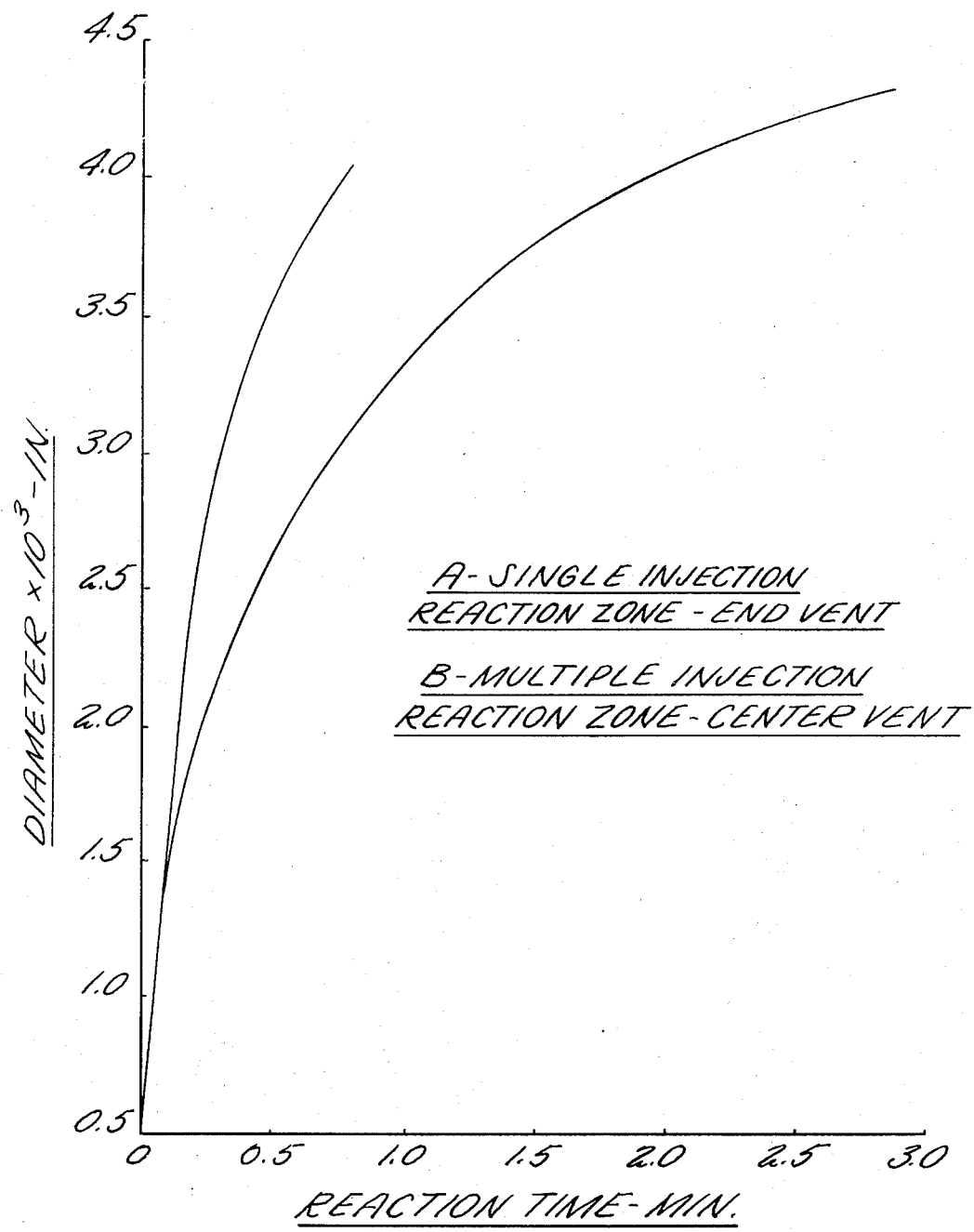

# United States Patent Office 3,549,424
Patented Dec. 22, 1970

3,549,424
METHOD FOR PRODUCING FILAMENTARY BORON
Charles K. Rice, Thompsonville, Conn., assignor to United Aircraft Corporation, East Hartford, Conn., a corporation of Delaware
Filed Feb. 24, 1967, Ser. No. 618,511
Int. Cl. C23c *11/00*
U.S. Cl. 148—6.3
8 Claims

ABSTRACT OF THE DISCLOSURE

A chemical deposition process for producing continuous boron filaments by reducing boron trichloride on a resisitively heated tungsten wire, the wire being drawn through a vertical reactor which is divided into upper and lower stages, the reactant gas mixtures being introduced to the lower stage at both ends thereof and exhausted near the center to provide both concurrent and countercurrent flow conditions and differing gas compositions at the respective ends, the gas discharged from the lower stage being utilized as the feed for the upper stage.

BACKGROUND OF THE INVENTION

It is known that filamentary boron may be produced by pyrolytic techniques in a process wherein the boron is chemically deposited on a resistively heated tungsten wire which is drawn through a gaseous reactant stream consisting of boron trichloride admixed with hydrogen.

Early investigations quickly revealed the potential utility of these fibers in the production of new and improved structural materials designed to meet the stringent and imposing requirements of space age hardware. One of the most promising concepts to evolve from these investigations is that of fiber-reinforced composites which offer the potential of significant improvements in the composite modulus utilizing continuous filaments of boron which are characterized by high strength, a high modulus of elasticity and low density, as well as very favorable temperature characteristics. Although the potential of filamentary boron is thus recognized, realization of this potential in practical hardware has not yet occurred to any great extent, primarily since the availability of this material is quite limited, being currently produced in laboratory-size lots in processes characterized by a very slow production rate. Nor will its full potential even be fully realized unless the processes can be so developed and refined as to improve the rate and cost of production of such filaments in processes yielding a product having consistently reproducible properties.

SUMMARY OF THE INVENTION

The present invention relates to the production of filamentary boron by pyrolytic techniques in an improved process and apparatus whereby the production rate has been significantly increased and the cost of production significantly reduced with no deterioration of the desirable filament properties.

In accordance with this invention a resistively heated metallic wire formed of a suitable material, including such metals as tungsten, tantalum and molybdenum, is drawn through a gaseous reactant stream consisting of a decomposable boron-containing gas, such as boron trichloride, usually admixed with hydrogen. The reactor is divided into an upper stage and a lower stage, the wire being exposed to both concurrent and countercurrent reactant gas flow in the lower stage, the effluent gas from the lower stage being used as the feed for the upper stage.

It is observed in processes of this type that the temperature profile of the wire along its length is not uniform within the reactor, but goes through a maximum, the location of which appears to be a function of the reactant gas composition, the wire drawing rate, the electrical power supplied to the wire, and the direction of gas flow. The described temperature distribution is caused by resistance changes resultant from the coating achieved on the wire and variations in the reaction rate. Additionally, changes in the diameter of the wire as coating occurs affect the rate of heat loss by radiation, convection and conduction.

It has been observed that the fastest growth rates take place at the hotter region of the wire, although temperature is not the only factor affecting the growth rate. Merely increasing the wire temperature is not the key to the production rate problem, however, since above certain wire temperatures spurious growths are effected which drastically reduce the ultimate tensile strength of the filament. When the voltage across the wire, in the boron trichloride-hydrogen system, was adjusted to produce a temperature maximum approximating 1300° C., and all other variables were held constant, a change from concurrent to countercurrent gas flow with respect to the drawing direction produced a pronounced change in the wire temperature profile, shifting the location of the peak temperature away from the wire inlet end of reactor. Unfortunately, this procedure also drastically reduced the fiber growth rate. It appears that the coating reaction is hindered in the countercurrent flow situation so that a greater length of wire travel must occur before a sufficient deposition and reaction between the coating and substrate occurs to effect the observed temperature rise. It was thus made clear that mere gas flow reversal was not the answer.

In the present process a series reactor arrangement is utilized, the reactor comprising an upper stage and a lower stage. In the lower stage the reactant gases are introduced at both ends of the stage and discharged from the central portion of the lower stage to provide both concurrent and countercurrent flow regions in this stage. With this arrangement it is possible and in fact desirable to provide a different reactant gas composition at the opposite ends of the lower stage. This arrangement in the lower stage in and of itself produces more uniform wire temperatures and has unexpectedly tripled the production rate of filamentary boron with a resulting product of exceptional uniformity and consistency. In a 36 inch long reactor, 3.2 mil boron fiber has been consistently produced at 345 feet/hour, the fibers exhibiting an average ultimate tensile strength of 460,000 p.s.i.

The improved process just described, wherein concurrent and countercurrent gas flow in the reactor are utilized, is the subject matter of a copending application entitled Method for Producing Filamentary Boron and Apparatus Therefor, by R. Fanti and U. Kuntz, Ser. No. 618,509, filed Feb. 24, 1967, the copending invention sharing a common assignee with the present invention.

It was found that a substantial and unexpected increase in the boron production rate could be effected by providing a prior or upper stage to the reactor and utilizing the effluent gas from the lower stage as the feed for the upper stage. In an overall reactor having an upper stage 26 inches long and a lower stage 48 inches long, 4 mil filamentary boron is routinely produced at rates of 775 feet/hour and higher with no deterioration in the properites of the filaments. In fact the diameter tolerance can be held closer than in the previous processes, analysis establishing the production of good fiber with a diameter of 0.004±0.0001 inch, with considerably less attention on the part of the operator than was previously the case. Furthermore, not only is the rate of production substantially increased as indicated, but the increase is effected with less feed gas than in previously used configurations.

The increase in the production rate was truly unexpected inasmuch as previous experimentation had not demonstrated any clear advantage to staging and, in fact, the results of prior work dictated against staging. It appeared to be a question of stability in the process, since early staged reactors could not be run at maximum temperature because of system instability. The stability of the present process, however, has been clearly demonstrated by the exceptional uniformity of the filamentary boron produced thereby.

BRIEF DESCRIPTION OF THE DRAWING

FIG. 2 is a graph illustrating the various boron deposition rates achievable in the various reactor configurations.

DESCRIPTION OF THE PREFERRED EMBODIMENTS

Figure 1:
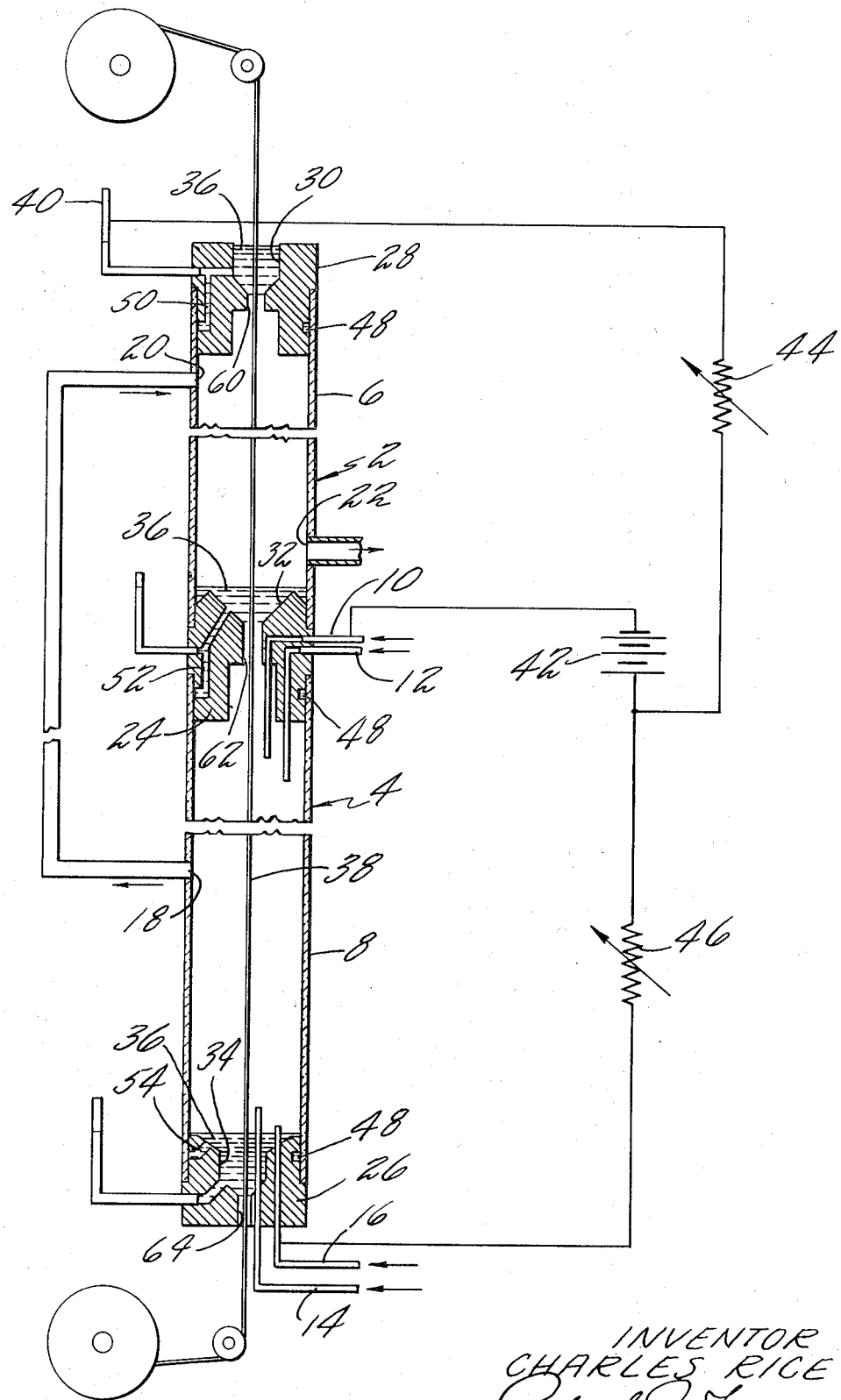
FIG. 1 is a view of a preferred reactor, taken in elevation and partially in cross-section, which is particularly adapted to use in the practice of the present invention.

Referring first to FIG. 1, the preferred reactor may be seen to be formed of an upper stage 2, and a lower stage 4, arranged in series. Each stage may be seen to comprise a tubular containment vessel 6 and 8, respectively. Dual gas inlets 10, 12 and 14, 16 are provided at each end of the lower stage, the inlets 10 and 14 being utilized as the hydrogen feed, the inlets 12 and 16 being utilized as the boron halide feed ports to the reactor. The gases admitted to the reactor through the respective inlets are exhausted through a common exhaust port 18 positioned near the central portion of the lower stage to provide both concurrent and countercurrent gas flow in the lower stage with respect to the direction of wire movement through the reactor. The containment vessels 6 and 8 are formed of quartz or Pyrex, although a wide variety of other dielectrics or glasses are also suitable in this apparatus as described.

The effluent gas from the lower stage is exhausted through port 18 and is utilized as the feed for the upper stage, being admitted thereto through inlet port 20. This effluent gas admitted through port 20 will contain not only the basic boron halide and hydrogen as well as any catalytic agents that have also been introduced, but also the products of reaction generated in the lower stage, principally hydrogen chloride. The spent gases from the upper stage are exhausted through port 22 to scrubbing, recovery and/or reclamation equipment.

The gas inlets to the lower section penetrate and are electrically connected to the metallic end plugs 24 and 26 which provide the end closures for the lower stage and, also, provide convenient means through which the power may be supplied to the wire for resistance heating purposes. Plug 24 will be seen, additionally, to provide the lower end closure for the upper stage, the upper end of the upper stage being closed by the end plug 28.

Although the respective plugs 24, 26 and 28 may be seen to differ in configuration as a function of their location and function in the reactor, they all incorporate a number of common features. They each are formed to provide a well 32, 34 and 30, respectively, for containing a suitable conductive sealant 36, such as mercury, which serves the dual purpose of providing a gas seal around the wire 38 where it penetrates the ends of the reactor stages and further providing electrical contact between the moving wire and the respective plugs, which are in turn electrically connected through the tubes 10, 16 and 40, and conducting leads, to a DC power source 42. Power admitted to the respective stages is conveniently regulated by the variable resistances 44 and 46. The plugs are further provided with annular surface grooves 48, which in turn communicate with the wells provided in the respective plugs by means of passageways 50, 52 and 54, to provide sealing around the plugs and prevent the escape of gas thereby. Sealing for the lower end of the upper stage is provided by the simple expedient of slightly overfilling the well 32.

The respective plugs are further each formed with a centrally oriented orifice 60, 62 and 64, which is large enough to permit the unimpeded passage of the wire therethrough but which, in combination with the wire, is small enough to retain the mercury, through surface tension forces, in the respective wells. Orifices of 15 mils diameter have been used in apparatus of the type described using a ½ mil wire feed.

Although it has not been shown, in several instances the plugs have been modified to accommodate an orificed ruby insert through which the wire passes and which provides the sealant retainment function previously mentioned. The jewels, of course, provide increased life to the orifice and less filament contamination in the process. In more recent constructions, the orifice-forming member or members have been formed of tungsten to provide further reduced undesirable contamination and apparatus cost reduction.

As previously mentioned, in the lower stage of the reactor, the respective gas compositions introduced thereto at both ends thereof are preferably different in the optimum process and, hence, the wire passing through this stage is exposed to different reactant gases in terms of boron halide concentration as a function of its linear position in the reactor. The rate of reaction and, hence, the deposition rate increases geenrally with the effective concentration of the boron halide in the gas mixture. While various mol percentages of from 2–50 percent boron trichloride were employed at various times in the course of experimentation, the optimum percentage appears to be established at about 30 mol percent.

According to the present invention, the respective boron halide concentrations in the upper and lower regions of the lower stage of the reactor are preferably adjusted to provide a peak temperature in both of these regions, the peak temperature being selected to be below that at which the previously-mentioned spurious growths form. In the system mentioned, a peak temperature of approximately 1300° C. has been found satisfactory.

It has been established that, in order to achieve the desired temperature peaking in both regions of the lower stage, the boron halide concentration in the lower region will exceed that in the upper region. Satisfactory filaments will be obtained with a volume ratio of boron trichloride to hydrogen in the upper region ranging from 0.25 to 0.5 and in the lower region ranging from 0.5 to 3.0. The most preferred boron trichloride-hydrogen ratio in the upper region of the lower stage on a volume percentage is about 1/2.5, while that preferred at the lower region is about 1/1.6. While the particular composition of the gas fed to the upper stage has not been analyzed, it comprises unreacted boron halide and hydrogen together with substantial amounts of hydrogen chloride which occurs as the by-product of the boron deposition process in the lower stage of the reactor. In the upper stage the total effluent from the lower stage is utilized as the feed and the voltage is adjusted to maintain a wire peak temperature in the range for the purposes previously mentioned.

Tests were conducted at various pressure loads of between 1 and 50 atmospheres to determine the effect of the reactant gas pressure on the growth rate. It appears that increases in pressure increase both the initial and subsequent growth rates. However, in unheated reactors and under the limitations of room temperature operation, the partial pressure of boron trichloride available is only slightly over one atmosphere. Similarly, numerous tests were performed utilizing catalytic agents admixed with the reactant gases. In any event, regardless of the pressures utilized or the presence of particular catalytic agents, adherence to the principles set forth herein will provide substantial improvements in the boron filament production rate and, further, in the uniformity and reproducibility of the end product.

EXAMPLE

A reactor was constructed of Pyrex tubing in accordance with the illustration of FIG. 1. The tubing in both upper and lower stages was 18 mm. outside diameter, 15 mm. internal diameter, the upper stage being approximately 26 inches long and the lower stage being approximately 48 inches in length. The total gas composition at each end of the lower stage was controlled to provide a peak temperature of about 1300° C. in each section of the lower stage, the gases admitted at the upper end thereof comprising 1050 cc./min. boron trichloride and 2450 cc./min. hydrogen, the gases admitted at the bottom end of the reactor comprising 1050 cc./min. boron trichloride and 1600 cc./min. hydrogen. The gases were exhausted from the lower stage through a centrally located common exhaust port and fed directly to the upper end of the upper stage. Gas pressure in the reactor was approximately atmospheric. Tungsten wire having a diameter of 0.5 mil was drawn down through the reactor at 775 feet/hour to produce a resulting filament having a diameter of 4 mils. A DC voltage of 1380 volts and 290 milliamps was impressed across the lower stage of the reactor and a DC voltage of 600 volts was impressed across the upper stage. Establishment of the initial operating parameters was initially established by two-color (ratio) pyrometry techniques and the system was controlled thereafter, and in the stabilized condition, upon the basis of constant voltage at the upper stage and constant current in the lower stage.

A variety of different substrate materials have been evaluated in the course of process development, including, in addition to tungsten, tantalum, aluminum, molybdenum, aluminum-coated tungsten, tungsten-coated silicon and glass-coated copper. Boron deposition on both tantalum and molybdenum proved quite successful, the deposition rate on tantalum being equal to that on tungsten within the usual experimental error, that on molybdenum being slightly less than that on tungsten. At various times, tests with substrate diameters of 0.5–20 mils were conducted and reactor lengths in various experiments were varied between 16 and 48 inches.

Filamentary characterization studies were undertaken to determine the ultimate tensile strength consistency, diameter consistency, and cyclic fatigue behavior of the fibers produced. Average ultimate tensile strengths were established at about 460,000 p.s.i. for the 3 mil filaments, and fiber diameters were constant within ±0.0001 of an inch. Rotating beam cyclic tests demonstrated the excellent fatigue behavior of the fibers.

What is claimed is:

1. In the processes for producing continuous boron filaments by chemical deposition on a resistively heated wire from a reactant gas mixture, including a decomposable boron-containing gas, as the wire is drawn through a reactor, the improvement which comprises:
 exposing the wire consecutively to a first, second and third gas mixture, the second gas mixture being admitted to the reactor to provide concurrent gas flow with respect to the direction of movement of the wire, the third gas mixture being admitted to the reactor to provide countercurrent gas flow with respect to the direction of movement of the wire, the first gas mixture comprising the effluent from the concurrent and countercurrent flow regions;
 and adjusting the concentration of the boron-containing gas in the second and third gas mixtures to provide a wire temperature peak in both the concurrent and countercurrent flow regions of the reactor.

2. The improvement according to claim 1 wherein: the second and third gas mixtures each contain a boron halide and hydrogen as the active components.

3. In the processes for producing continuous boron filaments by chemical deposition on a resistively heated wire from a reactant gas mixture, including a decomposable boron-containing gas, as the wire is drawn through a reactor, the improvement which comprises:
 compartmenting the reactor to provide a first stage and a second stage arranged in series;
 admitting a first boron halide-hydrogen gas mixture to the second stage of the reactor adjacent the wire inlet and discharging the first effluent gas downstream of the second stage wire inlet;
 admitting a second boron halide-hydrogen gas mixture to the second stage of the reactor adjacent the wire exit and discharging the second effluent gas upstream of the second stage wire outlet;
 utilizing the first and second effluent gases as the feed for the first stage of the reactor and exhausting the same therefrom;
 and adjusting the boron halide concentration in the second gas mixture to provide a wire temperature peak in the downstream section of the lower stage of the reactor, the temperature peak approximating that of the wire in the upstream section of the lower stage.

4. The improvement according to claim 3 in which:
 the boron halide is boron trichloride;
 and the peak temperature of the wire is held below that at which spurious boron growths are formed.

5. The improvement according to claim 4 in which: the peak temperature of the wire does not exceed approximately 1300° C.

6. In the processes for producing continuous boron filaments by chemical deposition on a resistively heated wire from a reactant gas mixture as the wire is drawn through a reactor, the improvement which comprises:
 exposing the wire consectively to a first, second and third gas mixture, the second gas mixture containing boron trichloride and hydrogen as the active components in a volume ratio of boron trichloride to hydrogen of 0.25–0.5 and being admitted to the reactor to provide concurrent gas flow with respect to the direction of movement of the wire, the third gas mixture containing boron trichloride and hydrogen as the active components in a volume ratio of boron trichloride to hydrogen of 0.5–3 and being admitted to the reactor to provide countercurrent gas flow with respect to the direction of movement of the wire, the first gas mixture comprising the effluent from the concurrent and countercurrent flow regions; and
 adjusting the concentration of the boron trichloride in the second and third gas mixtures to provide a wire temperature peak in both the concurrent and countercurrent flow regions of the reactor.

7. In the processes for producing boron filaments by chemical deposition on a resistively heated wire from a reactant gas mixture as the wire is drawn through a reactor, the improvement which comprises:
 compartmenting the reactor to provide a first stage and a second stage arranged in series,
 admitting a first boron trichloride-hydrogen gas mixture to the second stage of the reactor adjacent the wire inlet and discharging the first effluent gas downstream of the second stage wire inlet, the volume ratio of boron trichloride to hydrogen in said first gas mixture being 0.25–0.5;
 admitting a second boron trichloride-hydrogen gas mixture to the second stage of the reactor adjacent the wire exit and discharging the second effluent gas upstream of the second stage wire exit, the volume ratio of boron trichloride to hydrogen in said second gas mixture being 0.5–3;
 utilizing the first and second effluent gases as the feed for the first stage of the reactor and exhausting the same therefrom; and
 adjusting the boron trichloride concentration in the second gas mixture to provide a wire temperature peak in both the upstream and downstream sections of the second stage of the reactor, the temperature peak in each section not exceeding approximately 1300° C. and approximately each other.

8. The improvement according to claim 7 in which: the respective gas mixtures are provided in the reactor at a pressure of approximately 1 atmosphere; and the wire has at least the surface portion thereof formed from at least one of the metals selected from the group consisting of tungsten, tantalum and molybdenum.

References Cited

UNITED STATES PATENTS

| | | | |
|---|---|---|---|
| 2,853,970 | 9/1958 | Novak | 117—107.1X |
| 2,930,347 | 3/1960 | Bulloff | 117—107.1X |
| 3,293,074 | 12/1966 | Nickl | 117—106(A)X |
| 3,365,330 | 1/1968 | Hough | 117—106X |
| 3,409,469 | 11/1968 | Kuntz | 117—106X |
| 3,410,715 | 11/1968 | Hough | 117—106X |
| 3,424,603 | 1/1969 | Schwartz | 148—6.3X |

ALFRED L. LEAVITT, Primary Examiner

J. R. BATTEN, Jr., Assistant Examiner

U.S. Cl. X.R.

117—102, 106, 119, 128; 118—49.1; 244—1